United States Patent
Choi et al.

(10) Patent No.: US 9,654,616 B2
(45) Date of Patent: May 16, 2017

(54) DISPLAYING A GROUP MESSAGE

(71) Applicant: Samsung Electronics Co., Ltd., Gyeonggi-do (KR)

(72) Inventors: Bokun Choi, Seoul (KR); SooJi Hwang, Gyeonggi-do (KR)

(73) Assignee: Samsung Electronics Co., Ltd., Yeongtong-gu, Suwon-si, Gyeonngi-do (KR)

( * ) Notice: Subject to any disclaimer, the term of this patent is extended or adjusted under 35 U.S.C. 154(b) by 77 days.

(21) Appl. No.: 14/284,913

(22) Filed: May 22, 2014

(65) Prior Publication Data

US 2014/0349627 A1 Nov. 27, 2014

(30) Foreign Application Priority Data

May 23, 2013 (KR) .................. 10-2013-0058596

(51) Int. Cl.
*H04M 1/725* (2006.01)
*H04W 4/08* (2009.01)
*H04W 4/12* (2009.01)

(52) U.S. Cl.
CPC ......... *H04M 1/72552* (2013.01); *H04W 4/08* (2013.01); *H04W 4/12* (2013.01)

(58) Field of Classification Search
CPC ........... G06F 17/3061; G06F 17/30867; G06F 9/5038; G06F 9/54; G06F 3/04886; G06F 17/211; G06F 17/30657; G06F 17/30707; G06F 3/0481; G06F 3/0488; G06Q 10/107; G06Q 10/109; G06Q 10/10; G06Q 30/0251; G06Q 30/0255; G06Q 30/0269; G06Q 50/01; G06Q 30/02; H04M 1/72552; H04M 1/57; H04M 1/274583; H04M 2203/654; H04M 2250/60; H04M 3/42382; H04M 3/4878; H04L 51/26; H04L 12/58; H04L 12/588; H04L 51/10; H04L 51/22; H04L 51/32; H04L 63/123; H04L 67/22; H04L 51/16; H04L 12/586; H04W 4/08; H04W 88/022; G08B 3/1091; G08B 5/224; G08B 3/105; G08B 5/227
See application file for complete search history.

(56) References Cited

U.S. PATENT DOCUMENTS

| | | | |
|---|---|---|---|
| 7,222,299 B1 * | 5/2007 | Lim | G06F 17/218 715/273 |
| 7,502,831 B1 * | 3/2009 | Macias | H04L 12/581 370/360 |
| 2003/0212746 A1 * | 11/2003 | Fitzpatrick | H04L 12/1827 709/206 |
| 2005/0267975 A1 * | 12/2005 | Qureshi | H04L 12/581 709/229 |
| 2006/0128404 A1 * | 6/2006 | Klassen | H04L 12/586 455/466 |
| 2006/0270461 A1 * | 11/2006 | Won et al. | 455/566 |

(Continued)

*Primary Examiner* — Nizar Sivji
(74) *Attorney, Agent, or Firm* — Cha & Reiter, LLC

(57) ABSTRACT

Disclosed herein are a method and apparatus for displaying a message. Text messages that were sent and received to and from a recipient are obtained. The text messages are displayed such that group text messages sent and received to and from a group of recipients that also includes the recipient are differentiated from text messages sent or received to and from just the recipient.

16 Claims, 18 Drawing Sheets

(56) References Cited

U.S. PATENT DOCUMENTS

| | | | |
|---|---|---|---|
| 2007/0214424 A1* | 9/2007 | Gilead | G06Q 10/107 |
| | | | 715/758 |
| 2007/0287483 A1* | 12/2007 | Park et al. | 455/466 |
| 2008/0195652 A1* | 8/2008 | Um et al. | 707/102 |
| 2009/0061825 A1* | 3/2009 | Neelakantan | H04L 29/12292 |
| | | | 455/412.1 |
| 2009/0177981 A1* | 7/2009 | Christie et al. | 715/758 |
| 2010/0011317 A1* | 1/2010 | Lee | H04L 12/189 |
| | | | 715/784 |
| 2010/0332518 A1* | 12/2010 | Song | G06F 3/0483 |
| | | | 707/769 |
| 2011/0231499 A1* | 9/2011 | Stovicek et al. | 709/206 |
| 2012/0210334 A1* | 8/2012 | Sutedja et al. | 719/314 |
| 2013/0225198 A1* | 8/2013 | Enoki et al. | 455/456.1 |
| 2014/0113596 A1* | 4/2014 | Filev et al. | 455/412.1 |
| 2014/0289644 A1* | 9/2014 | Clarke | H04L 12/5885 |
| | | | 715/752 |

\* cited by examiner

DISPLAYING A GROUP MESSAGE

CROSS-REFERENCE TO RELATED APPLICATION

This application claims priority from and the benefit under 35 U.S.C. §119(a) of Korean Patent Application No. 10-2013-0058596, filed on May 23, 2013, which is hereby incorporated by reference herein.

BACKGROUND

1. Technical Field

The present disclosure is related to a method and apparatus for displaying a group message.

2. Description of Related Art

Due to the rapid development of mobile communication, portable terminal devices have become widely popular around the globe. A user of such device may now carry out audio/video calls and transmit/receive text messages, multimedia messages, and the like. In this regard, a user may transmit a short message (SM), a long message (LM), or a multimedia message (MM) to a plurality of target terminals.

Base stations or other apparatus in various communication systems may transmit or receive such messages to each other based on international or domestic standards. Therefore, terminal manufacturers or communication service providers use message formats that conform to these standards.

A user may want to transmit a message to various target terminals simultaneously. By way of example, a group member A may want to notify members B, C, and D of a time, location, and other related information of a meeting. In this instance, member A can transmit short messages using phone numbers T_B, T_C, and T_D of members B, C, and D respectively. This may be less burdensome than creating and transmitting a separate message to each phone number. In this regard, terminals now provide a group message function. A user can use the group message function to input a message once and transmit that message to various destination addresses simultaneously.

Furthermore, some terminals may store messages whose transmission failed and may display the stored messages in response to a request by the user. Some terminals support so-called conversational views in which the terminal displays transmitted and received messages with one destination phone number in a time sequence. However, using this type of conversational view with group messages may be difficult and tedious for a user to read.

SUMMARY

Aspects of the present disclosure provide a method and an apparatus for displaying messages that enable a user to conveniently check messages sent to various recipients.

In one example, a method for displaying a message may include obtaining text messages that were sent and received to and from a recipient; and displaying the text messages in a chronological order such that group text messages sent and received to and from a group of recipients that also includes the recipient are differentiated from text messages sent or received to and from just the recipient.

In a further example, a message displaying apparatus may include a controller to obtain text messages that were sent and received to and from a recipient and display via a display unit the text messages in a chronological order such that group text messages sent and received to and from a group of recipients that also includes the recipient are differentiated from text messages sent or received to and from just the recipient.

Thus, the techniques described herein may allow a user to easily check messages sent and received to and from various recipients.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1A:
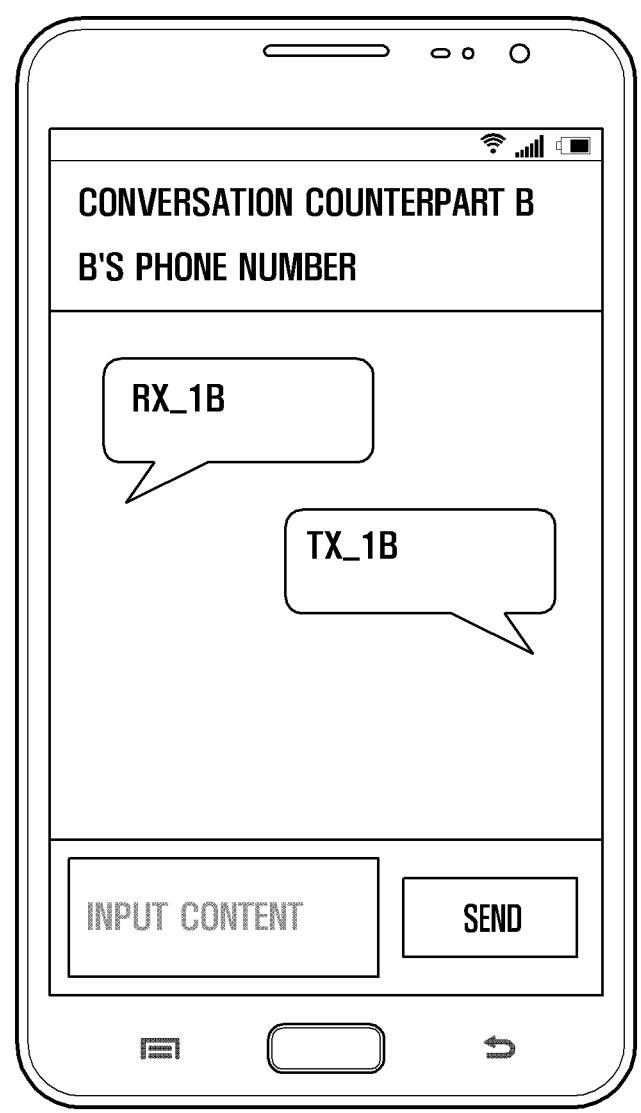
FIG. 1A, FIG. 1B, FIG. 1C, FIG. 1D, and FIG. 1E are diagrams illustrating an example screen in accordance with aspects of the present disclosure.

Hereinafter, examples of the present disclosure will be described in detail with reference to the accompanying drawings.

In describing the examples of the present disclosure, descriptions related to technical content well-known in the art and not directly associated with the present disclosure will be omitted. Such an omission is intended to prevent obscuring the main idea of the present disclosure.

By the same reasons, some elements are exaggerated, omitted, or schematically drawn in the attached drawings. Further, the size of each element does not entirely reflect the actual size. In the drawings, identical or elements are provided with identical reference numerals.

Examples directed to a method and an apparatus for displaying a group text message are described with reference to the drawings.

According to a short text message standard and a multimedia message standard, a message (a short message or a multimedia message) transmitted to a target apparatus may only include information associated with the target apparatus and not other targets, when the text message is a group message. The example of the group described above is described again. For example, when member A of the group wants to notify members B, C, and D of a time, a place, or other related information of a meeting, the member A can transmit a text message to the phone numbers T_B, T_C, and T_D of members B, C, and D respectively. The text message transmitted from member A to member B may come with the phone number of member A and the phone number of member B. However, in accordance with the short message standard, the text message transmitted from member A to member B will not come with the phone number of member C or the phone number of member D. Therefore, the receiving apparatus cannot confirm whether a received text message is a group text message, even if the apparatus internally supports a group message function for a text message or a multimedia message.

An instant messenger (IM) application can maintain a session for a group conversation. Therefore, the group conversation in a conversational display can be naturally maintained. However, since an SMS (Short Message Service) or MMS (Multimedia Message Service) scheme may not maintain a session, the group message may not be displayed or managed in the same manner as with an IM application.

FIGS. 1A to 1E are diagrams illustrating an example screen of a conversational view. In FIGS. 1A to 1E, a received text message is displayed on the left and a transmitted text message is displayed on the right.

With reference to FIG. 1A, the apparatus displays transmitted and received text messages to and from a counterpart B on a conversational view screen. A text message RX_1B received from the conversation counterpart B and a transmitted text message TX_1B transmitted to the counterpart B are displayed on the screen of FIG. 1A. When the conversation display is performed in this manner, text messages RX_1B and TX_1B may be displayed together so that the user can easily check the messages transmitted and received from counterpart B.

Figure 1B:
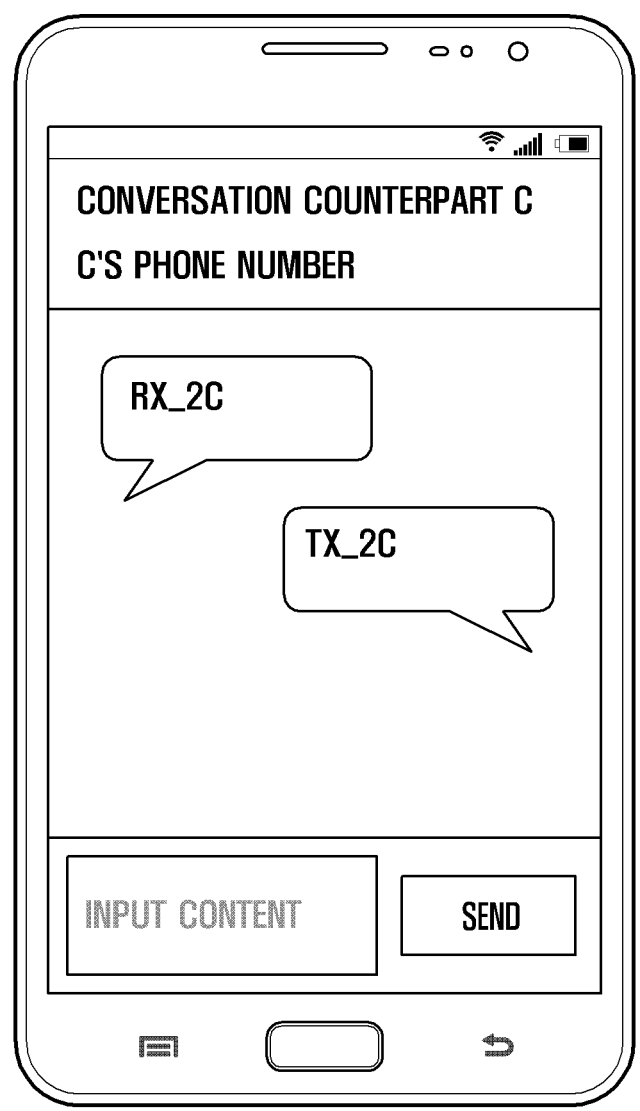

With reference to FIG. 1B, the apparatus presents transmitted and received text messages to and from another conversation counterpart C on the conversational view screen. A text message RX_2C received from the conversation counterpart C and a transmitted text message TX_2C transmitted to the conversation counterpart C are displayed on the screen of FIG. 1B.

Figure 1C:
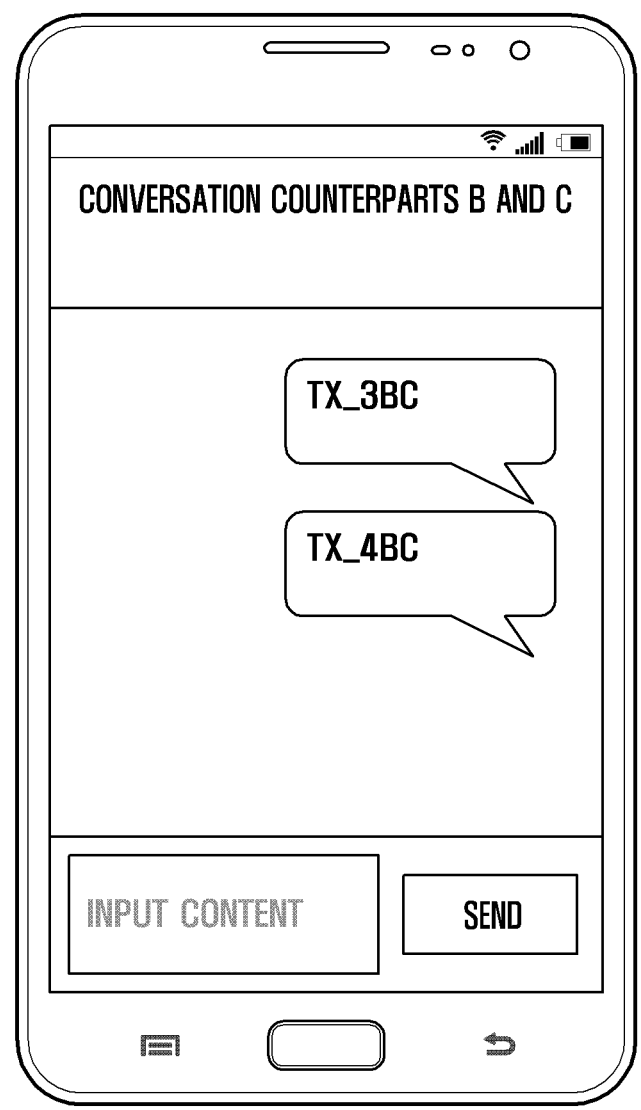

With reference to FIG. 1C, the apparatus presents group text messages transmitted to the conversation counterparts B and C on a conversational view screen. A text message TX_3BC and a text message TX_4BC transmitted to both counterparts B and C are displayed on the screen of FIG. 1C.

Figure 1D:
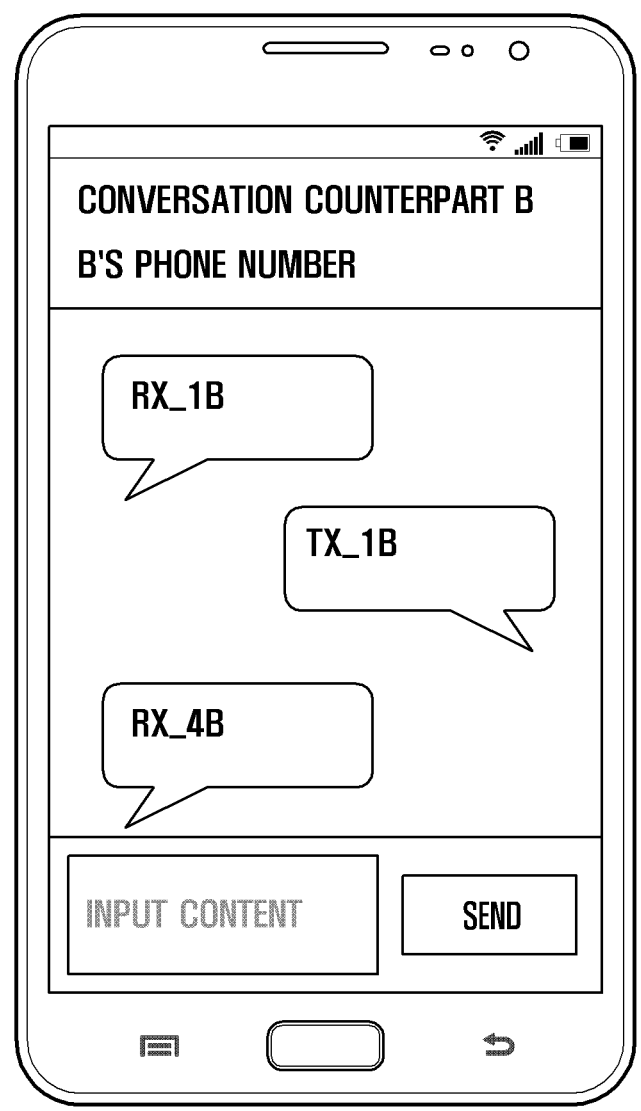
Figure 1E:
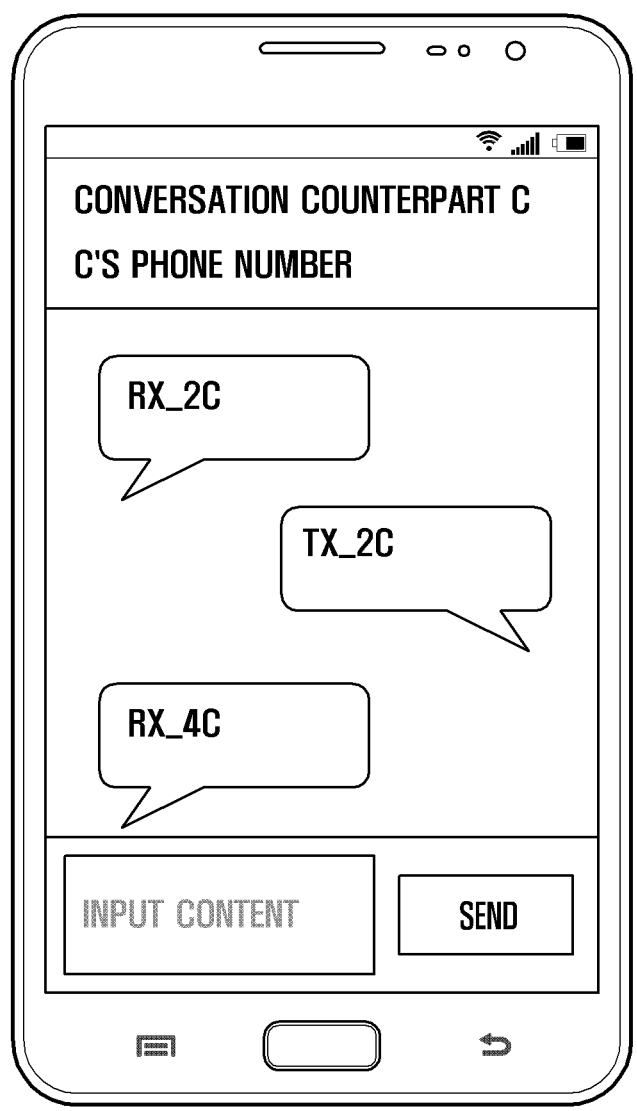

Hereinafter, the apparatus may receive a text message RX_4B in response to group text message TX_4BC from conversation counterpart B. Further, the apparatus may receive a text message RX_4C in response to group text message TX_4BC from conversation counterpart C. However, the responding text messages RX_4B and RX_4C are not displayed in the group text message view shown in FIG. 1C. As described above, the short message and the multimedia message protocol include a transmitter field and a recipient field, but do not include a field for distinguishing a group text message. Therefore, the apparatus that receives a short message or a multimedia message processes the text messages as normal individual text messages. As a result, the received text message RX_4B is displayed right after the transmitted text message TX_1B of FIG. 1A as illustrated in FIG. 1D. That is, RX_4B may be displayed on a screen showing messages to and from member B individually, even when text message RX_4B is in response to the group text message TX_4BC shown in FIG. 1C. As such, a user may find it difficult to keep track of messages to and from a single member of the group and messages to and from the entire group. FIG. 1E illustrates the same case as FIG. 1D but for counterpart C.

In order to solve the problem described above, all the group text messages received from members B and C may be displayed on the screen of FIG. 1C. However, it may be difficult to differentiate the messages from different members in the group. Therefore, the group text message may be displayed so that the text message content of the group text message are differentiated from the text message content of the other text messages. This method will be described with reference to FIGS. 2 to 7B.

Figure 2:
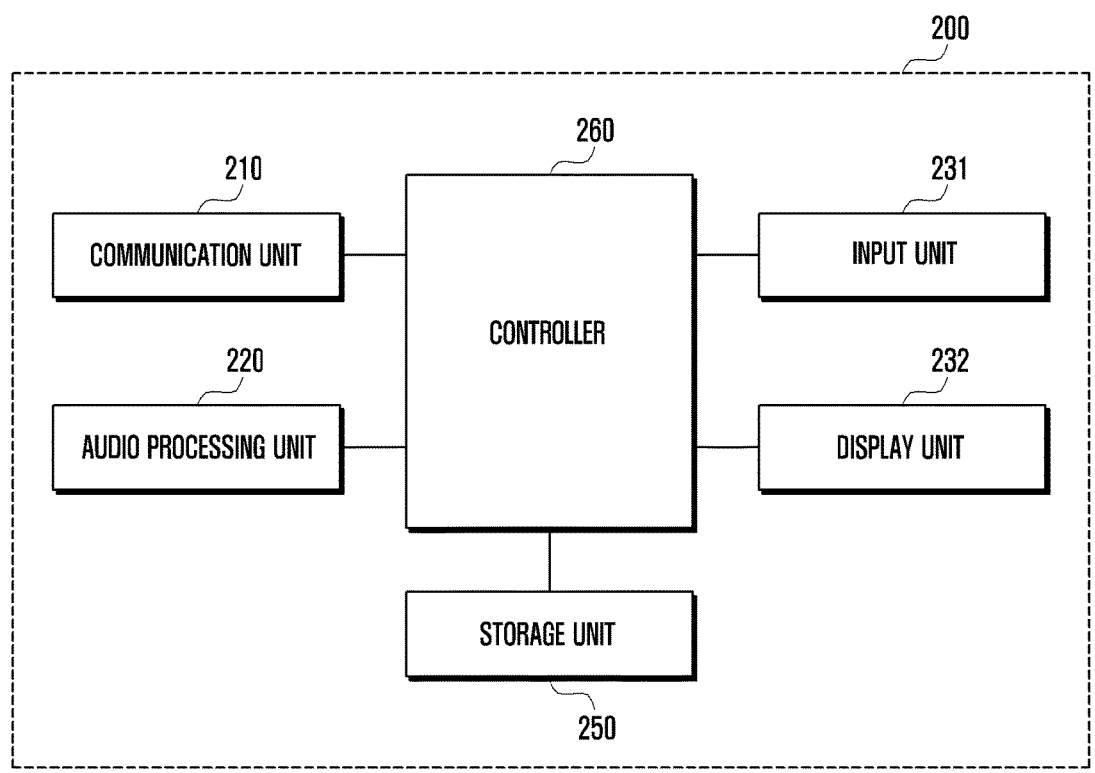
FIG. 2 is a block diagram illustrating an example message displaying apparatus in accordance with aspects of the present disclosure.

FIG. 2 is a block diagram illustrating an example message displaying apparatus 200 in accordance with aspects of the present disclosure. With reference to FIG. 2, the message displaying apparatus 200 may include a communication unit 210, an audio processing unit 220, an input unit 231, a display unit 232, a storage unit 250, and a controller 260.

The communication unit 210 performs a function of transmitting and receiving data or other signals for a wired communication and/or a wireless communication of the apparatus 200. The communication unit 210 may include at least one of a radio frequency (RF) transmitter that performs up-conversion and amplifies a frequency of a transmitted signal, an RF recipient that performs low-noise amplification and down-conversion to a received signal, and other similar communication modules. Further, the communication unit 210 may receive data through a wireless channel and output the data to the controller 260. The communication unit 210 may transmit the data output from the controller 260 through the wireless channel. If the message displaying apparatus 200 does not perform a wireless communication but only performs a wired communication, the communication unit 210 may include a configuration for performing the wired communication. Especially, the communication unit 210 may transmit a message or perform a conference call in response to an input of a user. The communication unit 210 may transmit or receive a text message, a multimedia message and/or other messages.

The audio processing unit 220 converts a digital audio signal into an analog audio signal with an audio codec to reproduce the analog audio signal through a speaker SPK, and converts an analog audio signal input from a microphone MIC into a digital audio signal with the audio codec. The audio processing unit 220 may include a codec. The codec may include a data codec that processes packet data or the like and an audio codec that processes an audio signal such as a voice. In the case of a message displaying apparatus that does not need an audio function, the audio processing unit 220 can be omitted.

The input unit 231 may receives a user input that may be detected by the controller 260. The input unit 231 can be embodied in a form of a touch sensor and/or a key input unit. The touch sensor senses a touch input by the user. The touch sensor can be configured with a touch sensor in a capacitive overlay scheme, a resistive overlay scheme, or an infrared beam scheme, or a pressure sensor. In addition to the sensors described above, all kinds of sensors that can sense a contact or a pressure of an object can be configured as a part of the input unit 231. The touch sensor senses a touch input of the user, generates a sense signal, and transmits the sense signal to the controller 260. The sense signal may include data relating to coordinates in at which the user inputs a touch.

Especially, the touch sensor can select a specific group message or sense user input or selection for selecting a specific recipient. The user input for the selection may include at least one of a touch (including multi-touch), a drag, and maintenance of a touch for more than a predetermined time.

The input unit 231 may be embodied in a form of a mouse or a keyboard.

The message displaying apparatus 200 may be configured to include the touch sensor as described above, but it should be understood that the examples described below are not applied only to the message displaying apparatus 200 including the touch sensor. If the examples herein are applied to a message displaying apparatus that does not include a touch sensor, a key input unit can substitute the function of the touch sensor.

The key input unit receives an input of a key operation by a user for controlling the message displaying apparatus 200, generates an input signal, and transmits the input signal to the controller 260. Especially, the key input unit may sense user input or selection for selecting a specific recipient. The key input unit can be configured with a keypad including number keys and arrow keys, and can be configured with functions keys on one or more sides of the message displaying apparatus 200. If the message displaying apparatus may perform all operations only with a touch sensor, the key input unit can be omitted.

The display unit 232 can visually provide the user with a menu, input data, a function setting information, and various kinds of other information of the message displaying apparatus 200. Especially, the display unit 232 may display message content in a conversational view format as described below. At this point, the group message will be displayed to be differentiated from the other transmitted messages which are not the group message. The display unit 232 may be embodied with any one of a Liquid Crystal Display (LCD), Organic Light Emitting Diode (OLED), and Active Matrix Organic Light Emitting Diodes (AMOLED). The display unit 232 performs a function of outputting a booting screen, a standby screen, a menu screen, a telephone call screen, and other application screens of the message displaying apparatus 200. Further, the display unit may display an interface screen for editing a contact group or an interface for a conference call under the control of the controller 260.

The storage unit 250 stores a program or data required for an operation of the message displaying apparatus 200. The storage unit 250 may be divided into a program area and a data area. The program area may include a program for controlling overall operations of the message displaying apparatus 200, an Operating System (OS) for booting the message displaying apparatus 200, an application program required to reproduce multimedia content, and application programs for other optional functions, for example, a camera function, an audio reproducing function, or an image or movie reproducing function. In addition, the program area can include a program code for performing a message displaying method in accordance with aspects of the present disclosure. The data area is an area in which data generated in accordance with the usage of the message displaying apparatus 200 is stored, and can store an image, a movie, a phone book, audio data, transmitted or received messages, and the like.

Especially, the storage unit 250 stores messages transmitted or received by the message displaying apparatus 200. The stored messages include, for example, a message content field and a transmission and reception field associated with the message. Further, the message may further include a field indicating whether the message is a transmitted message or a received message. For example, if the message is transmitted to one recipient, identification information of the recipient can be stored in a recipient field of the message. Otherwise, if the message is transmitted to two or more recipients, an identification information list of the recipients can be stored in a recipient field of the message. The message stored in the storage unit 250 is not limited to a form of the data structure described above. The message is sufficient if the message is stored in a data structure in which a transmitter and/or a recipient can be obtained by checking the stored message.

The controller 260 controls overall operations with respect to each element of the message displaying apparatus 200. Especially, the controller 260 can receive an input of the input unit and control the display unit 232 in accordance with the input. Especially, the controller 260 can control the display unit 232 so that messages transmitted and received from a specific counterpart are displayed in a conversational view format and the group message is differentiated.

Detailed operations of each element in the message displaying apparatus 200 will be described with reference to FIGS. 3 to 7B.

Figure 3:
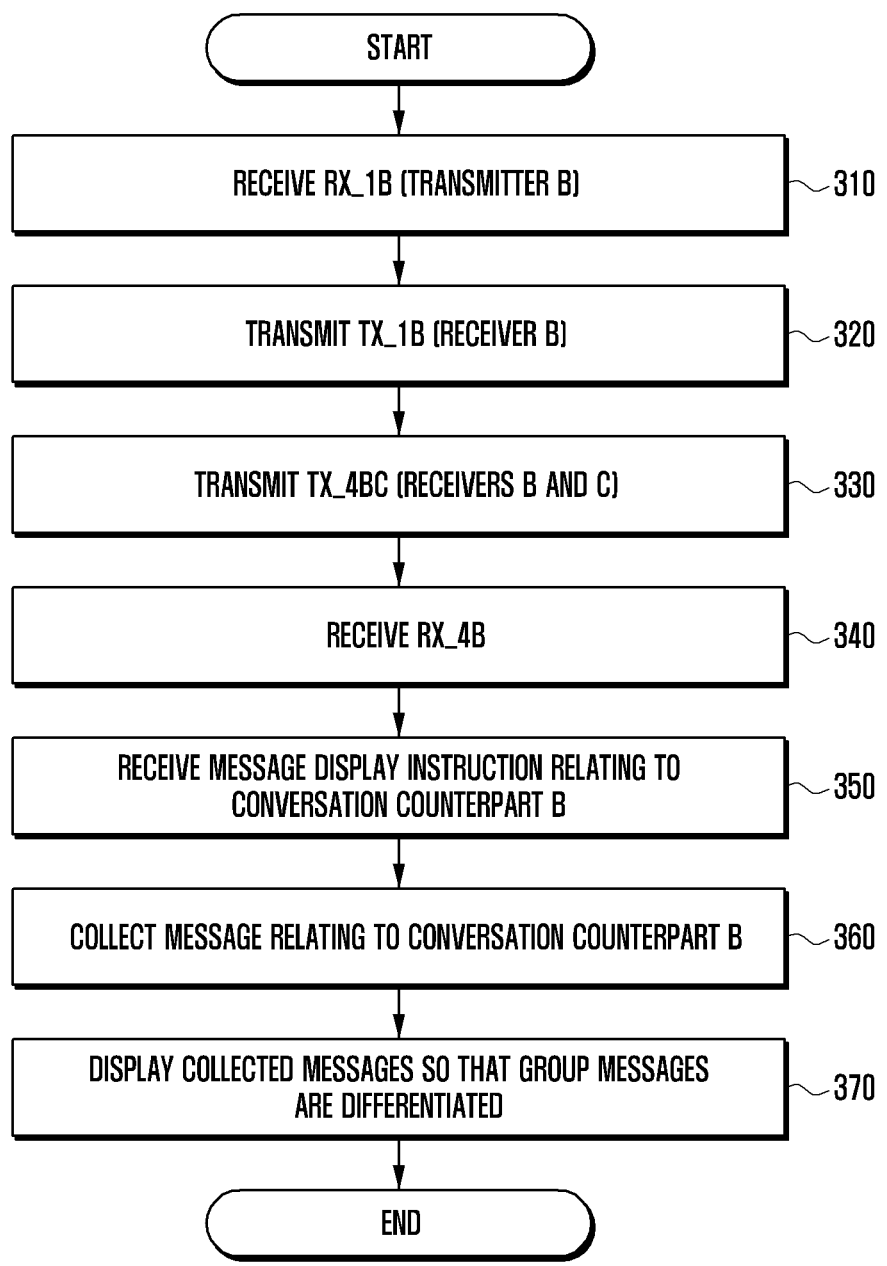
FIG. 3 is a flowchart illustrating an example message displaying process in accordance with aspects of the present disclosure.

Referring now to FIG. 3, a flowchart illustrating a text message displaying process in accordance with aspects of the present disclosure is shown. Blocks 310 to 340 describes an example text message transmission and reception process. At block 310, the message displaying apparatus 200 receives text message RX_1B from apparatus B. At block 320, the message displaying apparatus 200 transmits text message TX_1B to apparatus B. For example, the user may input text message content using input unit 231, select the receiving apparatus B, and input a text message transmission instruction. At block 330, the message displaying apparatus 200 transmits text message TX_4BC to apparatus B and C. That is, text message TX_4BC is a group text message sent to apparatus B and C. For example, the user may input text message content using input unit 231, select receiving apparatus B and C, and input a text message transmission instruction. At block 340, the message displaying apparatus 200 receives text message RX_4B from apparatus B.

At blocks 310 to 340, the storage unit 250 of the message displaying apparatus 200 stores the transmitted and received text messages. A given stored text message may be associated with the recipient or sender of the text message. For example, the content of the text message RX_1B may be associated with apparatus B and stored in an associated manner. Additionally, transmission or reception time of a given text message may be associated with the given text message. As such, controller 260 may search for content of a specific text message based on the sender/recipient or the transmit/receipt time.

At block 350, the controller 260 detects an instruction for display of messages associated with conversation counterpart B through the input unit 231. The message displaying apparatus 200 may display a list comprising at least a part of a most recently sent or received text message from each conversation counterpart. The user may select the text message display instructions for conversation counterpart B by selecting a specific text message or selecting counterpart B from a contact list. If a text message is received from conversation counterpart B, previously stored text messages associated with conversation counterpart B, including a most recently sent or received text message, may be automatically displayed.

At block 360, the controller 260 collects a text message associated with conversation counterpart B in response to the instruction at block 350. For example, all text messages associated with conversation counterpart B can be extracted by checking all text messages stored in storage unit 250. In another example, controller 260 may extract a predetermined number (e.g., 10) of most recent text messages among the text messages associated with conversation counterpart B. Controller 260 may obtain the recipient information of the text message and the transmission or reception time of the text message. A group text message may be transmitted to another conversation counterpart in addition to conversation counterpart B; therefore, the recipient of the text message needs to be obtained in order to differentiate the members of the group.

At block 370, controller 260 displays a text message collected by the display unit 232. The collected text message can be displayed in a conversational view format. For example, the collected text message can be displayed in a chronological order based on a time in which the collected text message was sent or received. For example, received text messages may be displayed on the left and transmitted text messages may be displayed on the right. In another example, the sent and received text messages may be displayed with different background colors, fonts, font sizes, font colors, or the like so that the sent text messages and the received text messages may be differentiated. In one example, displaying an icon or a text near a position in which the text message is displayed enables the user to know whether the text message is a sent text message or a received text message.

In another example, display unit 232 may display text messages such that group text messages may be distinguishable from text messages sent to a single recipient that are not group text messages (non-group text messages).

Figure 4A:
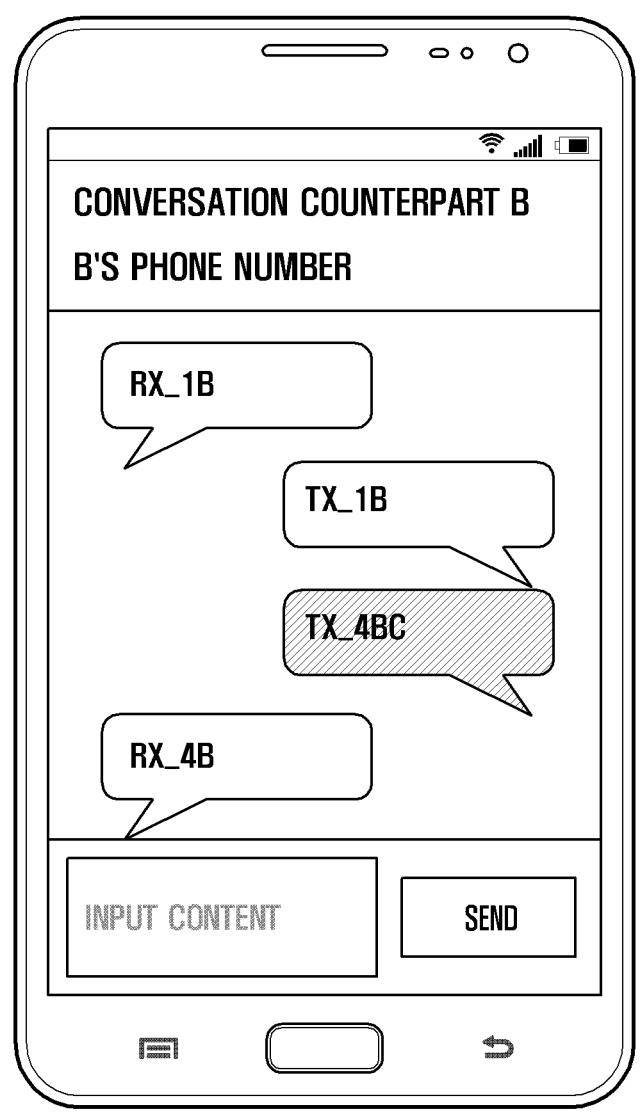
FIG. 4A, FIG. 4B and FIG. 4C are diagrams illustrating example message displaying screens in accordance with aspects of the present disclosure.
Figure 4B:
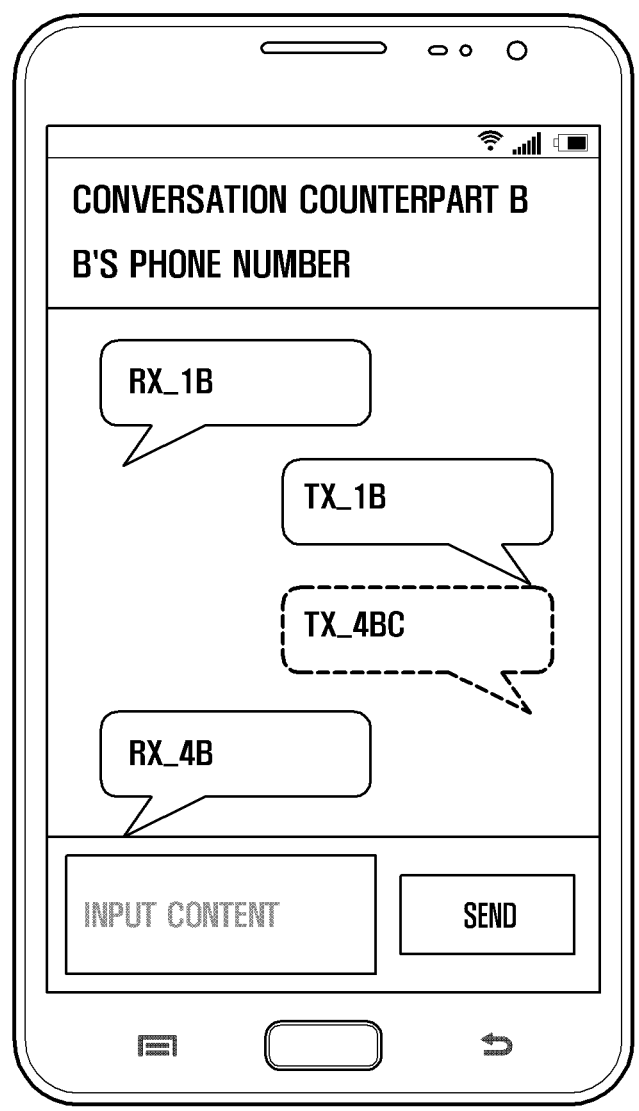
Figure 4C:
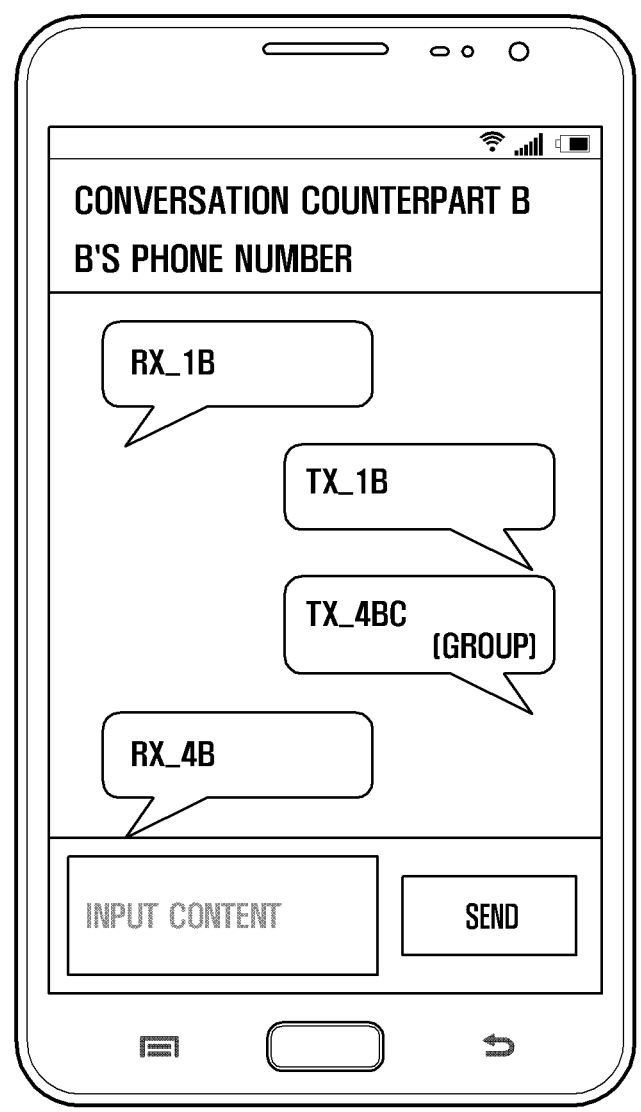

FIGS. 4A to 4C are diagrams illustrating example message display screens in accordance with aspects of the present disclosure. Referring to FIG. 4A, a box in which the group text message TX_4BC is displayed has a background image of a diagonal line pattern. The background image of a box in which the non-group text message TX_1B is displayed is white without patterns. In this manner, the display unit 232 may display text messages so that a group text message and a non-group text message are differentiated by displaying patterns of backgrounds of the text message box or by using different fonts, font sizes, font styles (bold, italic, underline, and the like), or font colors of the text message content. Further, the display unit 232 may display the text messages so that the group text message and the non-group text message are differentiated by displaying the group text message (or the box of the group text message) with an animation effect such as blinking or horizontally scrolling back and forth.

There may be two or more group text messages and each text message may belong to a different group. By way of example, if recipients of a first group text message and a third group text message are recipients B and C, and recipients of a second group text message are the recipients B and D, display unit 232 may display the text messages by using different colors and backgrounds so that a user may distinguish the first group text message from the second group text message. The first group text message and the third group text message may be displayed similarly, since the text messages belong to the same group.

With reference to FIG. 4B, the box of the group text message TX_4BC is displayed in a box with bold dashed border, which is different than the box of the non-group text message TX_1B. The display unit 232 may display the text messages such that the group text message and the non-group text messages are differentiated by using border colors of the boxes. As described with reference to FIG. 4A, if there are two or more group text messages and each text message belongs to a different group, the display unit 232 may display the text messages so that text messages for each group are differentiated by applying different box forms to each text.

With reference to FIG. 4C, a text 'group' indicating that a text message is a group text message is displayed at a position near the group text message TX_4BC. The display unit 232 may indicate that the corresponding text message is a group text message by displaying a text, an image icon, or the like at a position near the group text message. As described with reference to FIG. 4A, if there are two or more group text messages and each text message belongs to a different group, the display unit 232 may display text messages so that text messages for each group are differentiated by applying different texts and image icons for each group. In one example, the display unit 232 may display contact information of a different recipient in the group who is not recipient B at a position near the group text message. For example, since the recipients of the group text message TX_4BC are the recipients B and C, contact information of any conversation counterpart (here, the conversation counterpart C) other than the conversation counterpart B in the current screen may be displayed near the group text message TX_4BC. For example, at least a part of a name, a phone number, and a photo of the conversation counterpart C may be utilized as a text or an icon indicating that the text message is a group text message.

After the process of FIG. 3, the user may cause the message displaying apparatus 200 to perform additional operations for the recipients of the corresponding group.

Figure 5A:
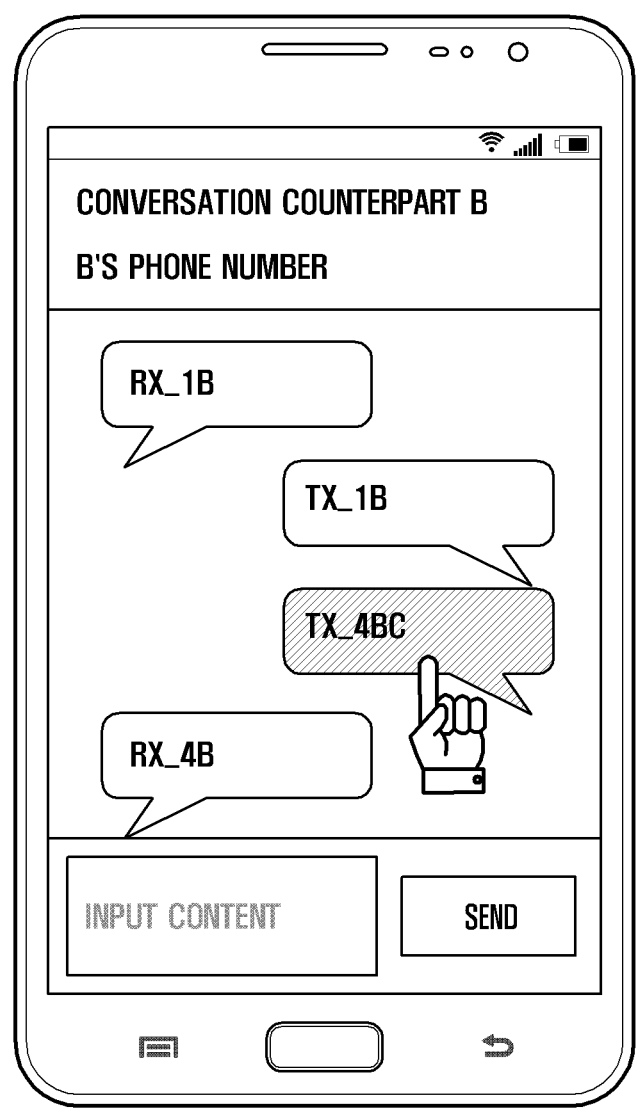
FIG. 5A, FIG. 5B, FIG. 5C and FIG. 5D are diagrams illustrating example message displaying screens in accordance with aspects of the present disclosure.

FIGS. 5A to 5D are diagrams illustrating example message display screens in accordance with aspects of the present disclosure. Referring to FIG. 5A, a group text message shown on message displaying apparatus 200 is selected. The user may select the group text message by touching a window of the group text message or moving a selection cursor to a position of the group text message with the key input unit.

Figure 5B:
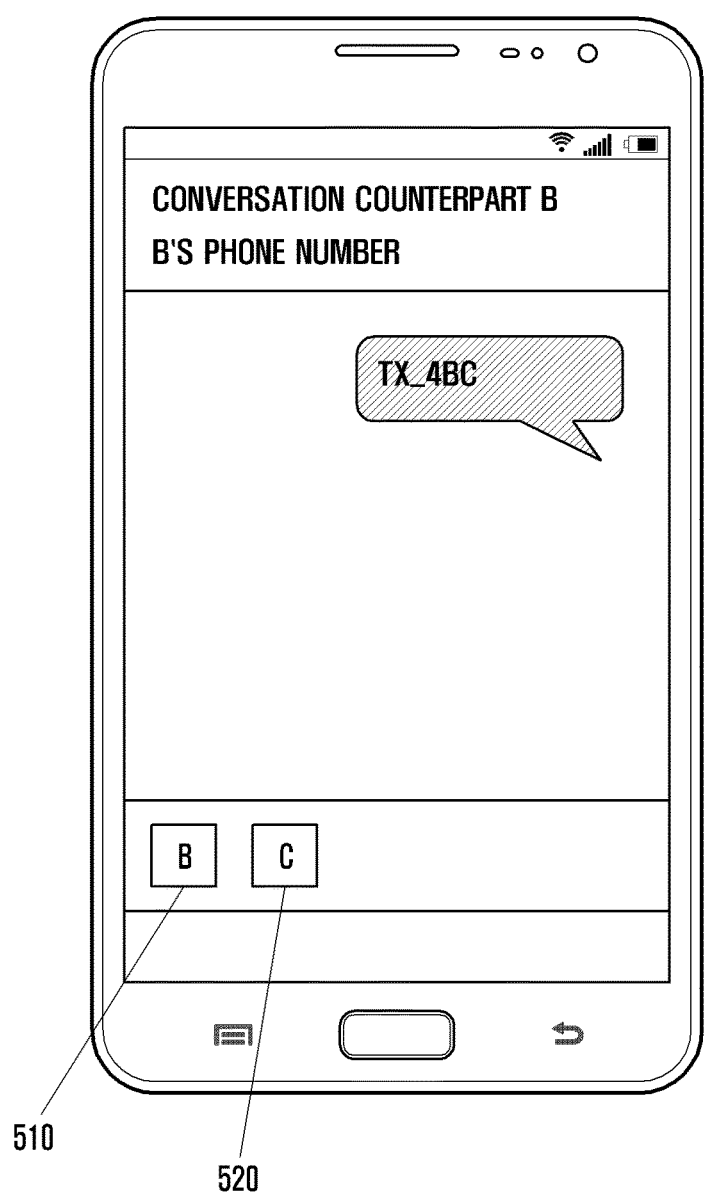

Referring now to the example in FIG. 5B, if a group text message is selected, the message displaying apparatus 200 may display list item 510 and 520 of the group text message TX_4BC as shown in FIG. 5B. The recipient list may be displayed in a variety of ways, such as in a horizontal direction, a vertical direction, and a grid form. If a space for displaying the recipient lists is not sufficient, a horizontal scroll bar and/or a vertical scroll bar may be provided. Each displayed item of the recipient lists may comprise at least some information associated with the recipient such as an identifier, a name, a picture of the contact, and the like. For example, a list item 510 associated with recipient B may include a picture and contact information associated with the recipient B.

Figure 5C:
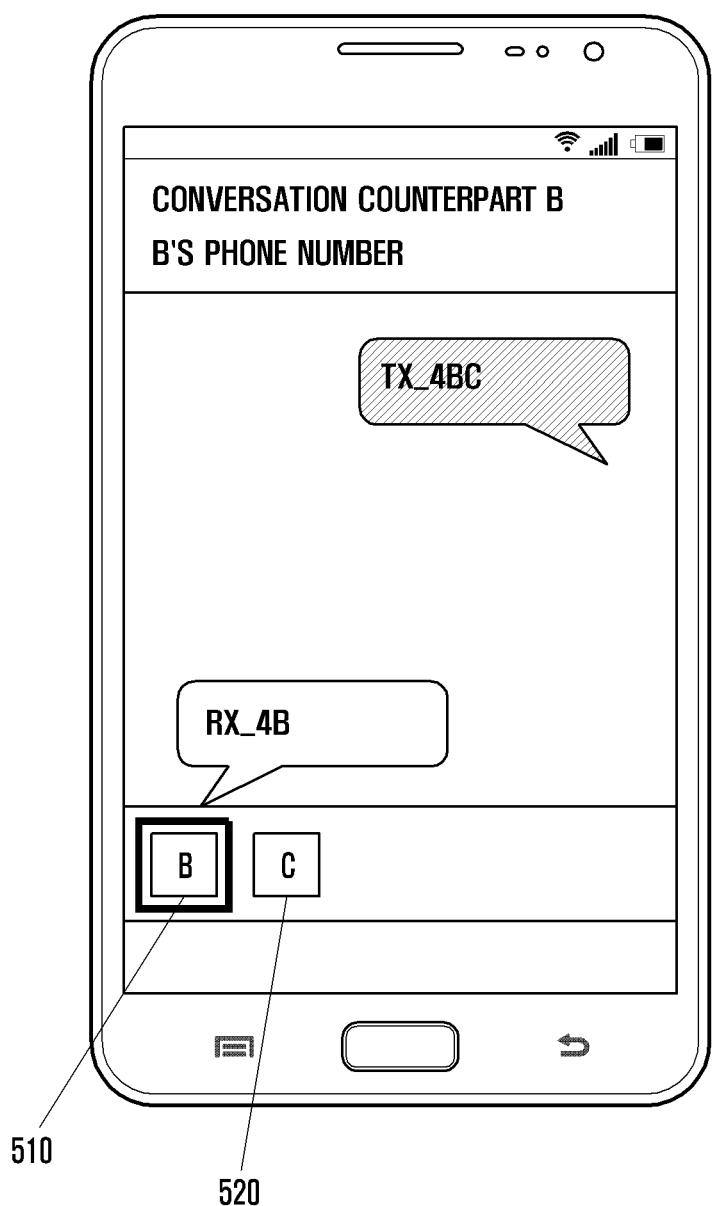

For example, if list item 510 of conversation counterpart B is selected, a screen as illustrated in FIG. 5C may be displayed. After group text message TX_4BC is displayed, display unit 232 may first display non-group text message RX_4B received from conversation counterpart B. In this example, display unit 232 may display a predetermined number of text messages received from conversation counterpart B, after group text message TX_4BC is displayed. For example, after group text message TX_4BC is displayed, the display unit 232 may display three of the most recent text messages corresponding to conversation counterpart B. In another example, the display unit 232 may display three of the most recent group text messages, which may include group text message TX_4BC, of which conversation counterpart B belongs.

Figure 5D:
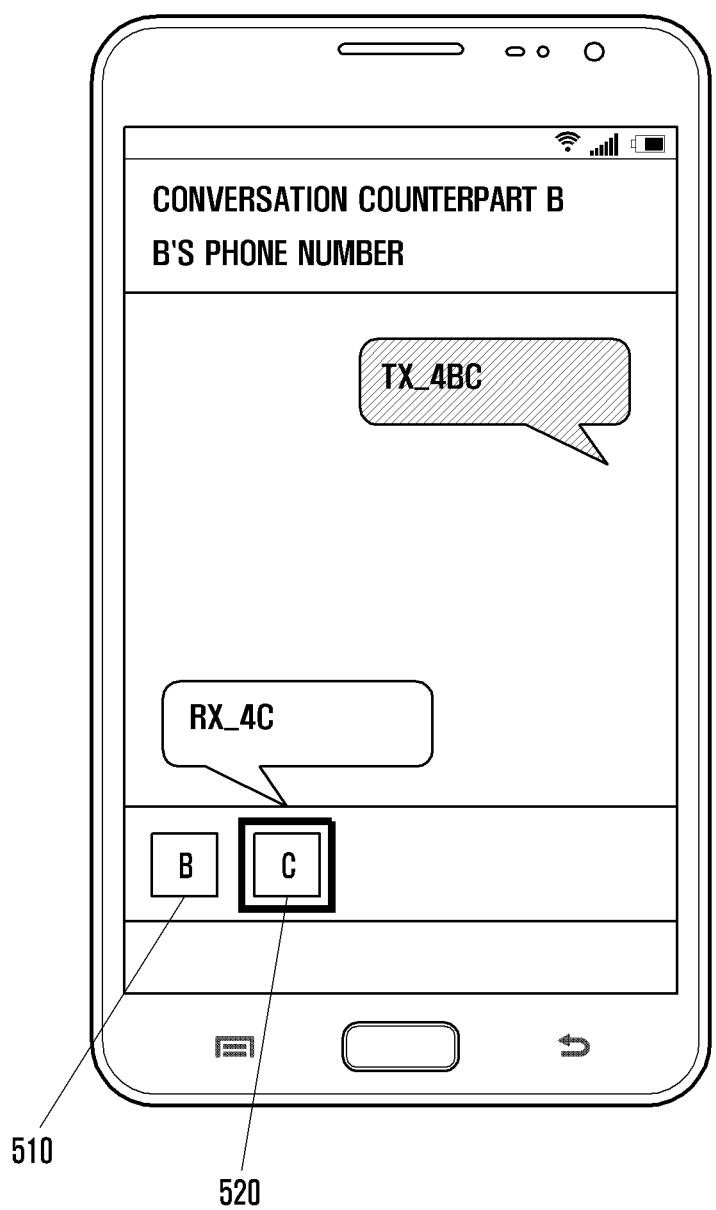

Similarly, if list item 520 of conversation counterpart C is selected, a screen as illustrated in FIG. 5D may be displayed. In the screen, the display unit 232 may display the text message RX_4C which may be the first text message received from conversation counterpart C after sending group text message TX_4BC.

In one example, if either list item 510 and 520 is selected, the display unit 232 may display a conversational view screen of the selected conversation counterpart. In this instance, the conversational view screen may be displayed as described above with reference to FIGS. 3 to 4C.

Figure 6A:
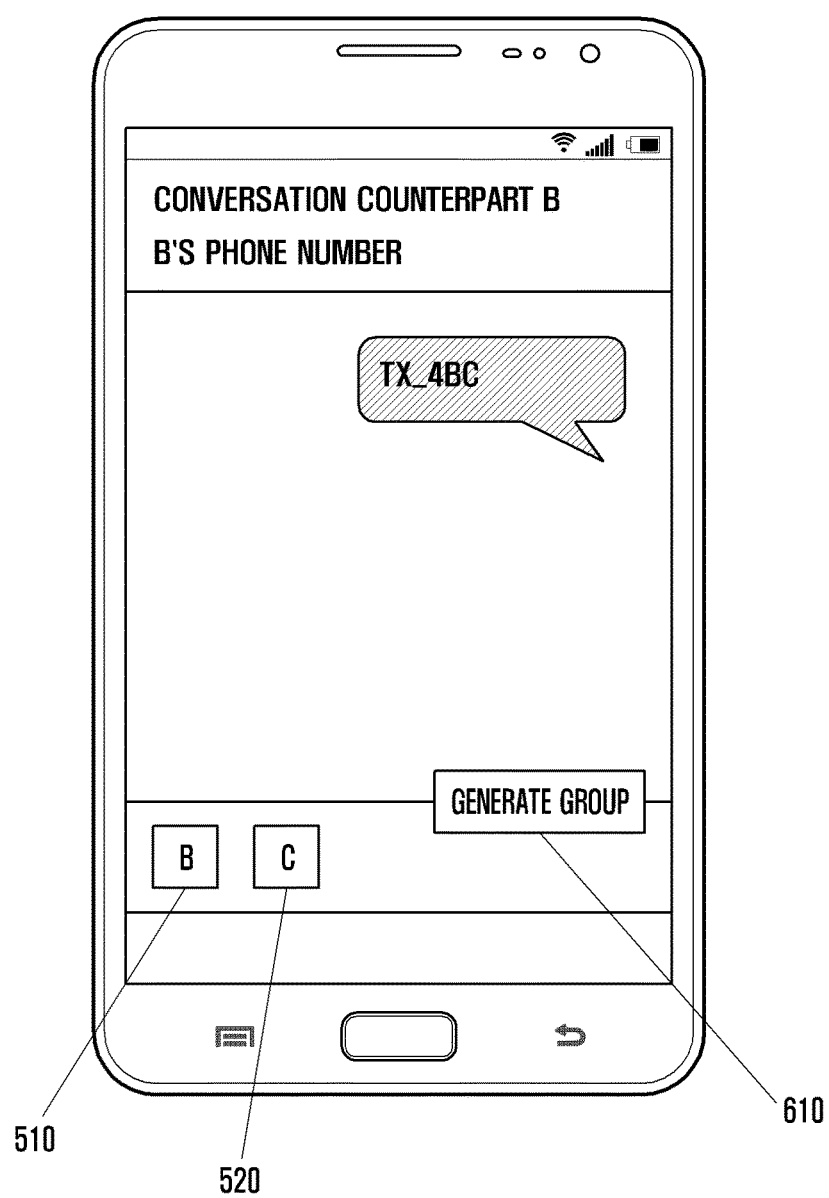
FIG. 6A and FIG. 6B are diagrams illustrating an example message displaying screen in accordance with aspects of the present disclosure.
Figure 6B:
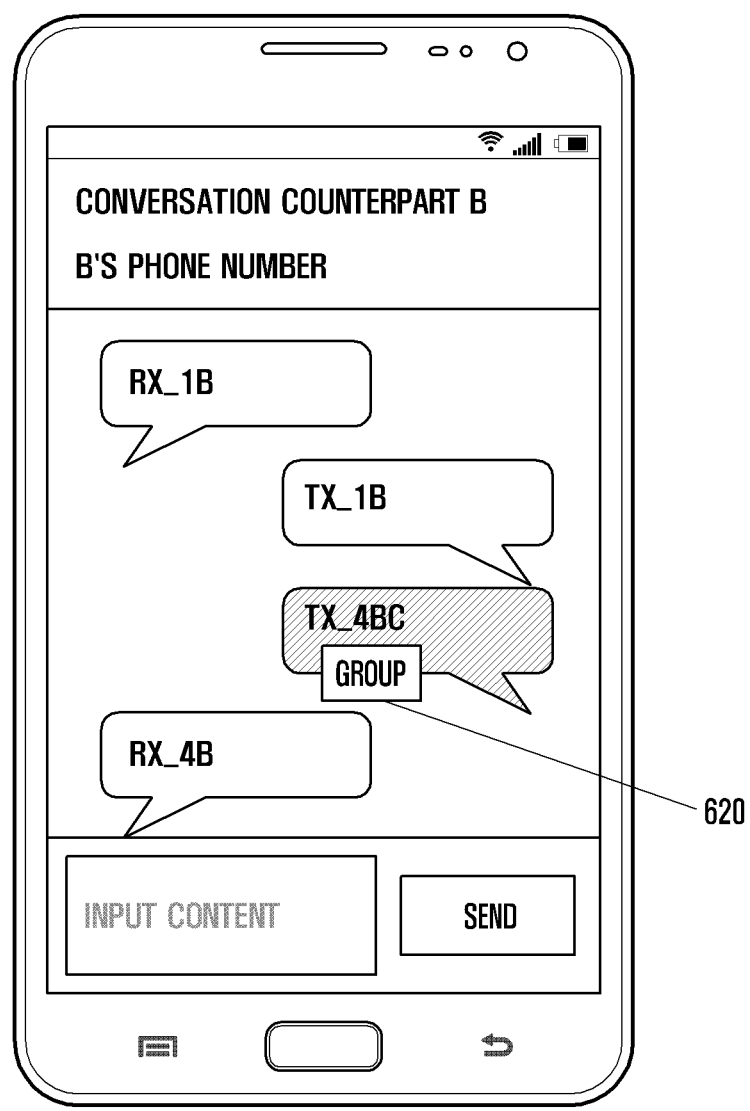

FIGS. 6A and 6B are diagrams illustrating an example message display screen in accordance with aspects of the present disclosure. Referring to FIG. 6A, a group generating button 610 may be displayed in addition to the list screen of FIG. 5B. The screen of FIG. 6A may be displayed if group text message TX_4BC is selected in the screen of FIG. 5A. The group generating button 610 may be used to generate a new contact group that includes recipients B and C or to add recipients B and C to an existing group. For example, if the user selects group generating button 610, the controller 260 may display an interface that allows a user to input a name of a new contact group. The new contact group may include recipients B and C. For example, the controller 260 may display an interface to generate a group by selecting at least one of the recipients B and C. In another example, if the user selects the group generating button 610, the controller 260 may display an interface to display lists of existing contact groups and select any one of the lists such that a contact group to which recipients B and C are to be added may be selected. Controller 260 may edit and modify a contact group in accordance with input detected on the interface. Once the the recipients are set up in the group, the user may easily send a group text message or conduct a conference call using the contact group including recipients B and C.

Referring now to FIG. 6B, the group generating button 620 may be displayed on the conversational view screen. The function of the group generating button 620 may be set to be identical or similar to that of the group generating button 610 of FIG. 6A.

Figure 7A:
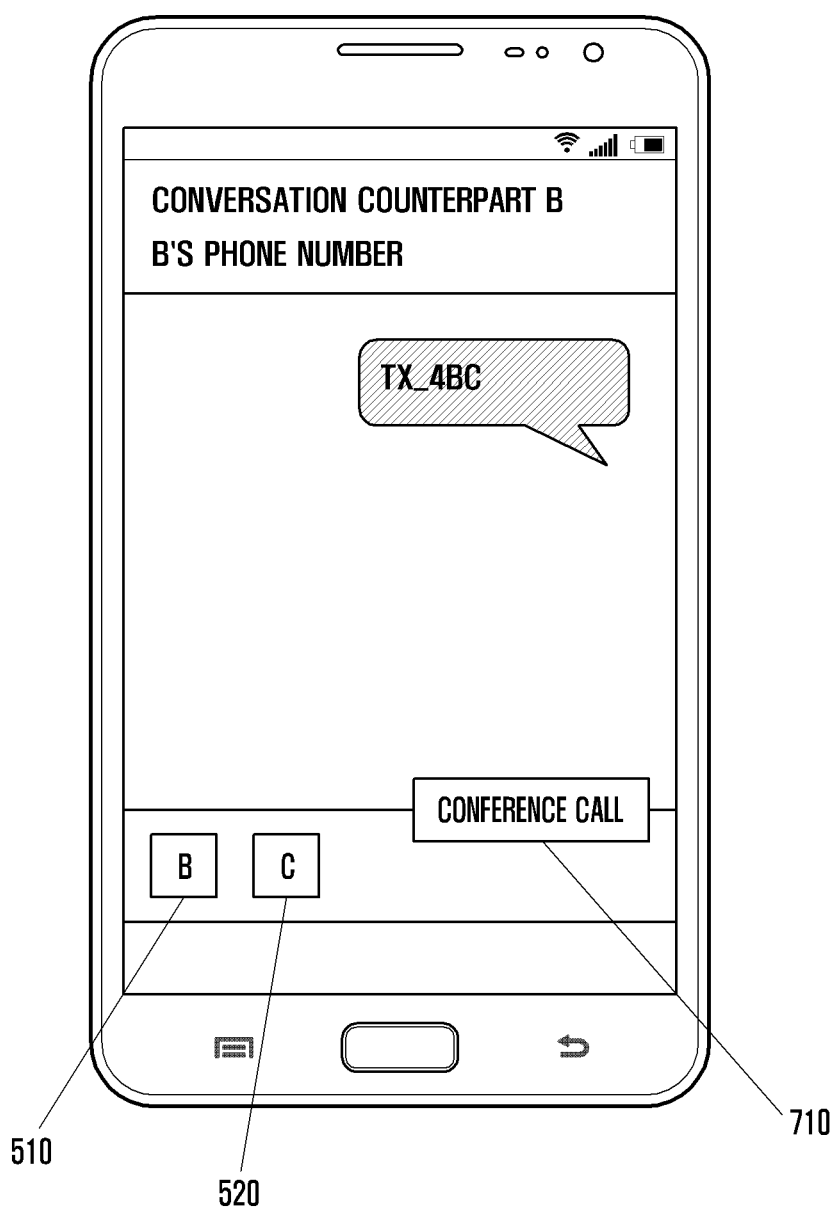
FIG. 7A and FIG. 7B are diagrams illustrating example message displaying screens in accordance with aspects of the present disclosure.
Figure 7B:
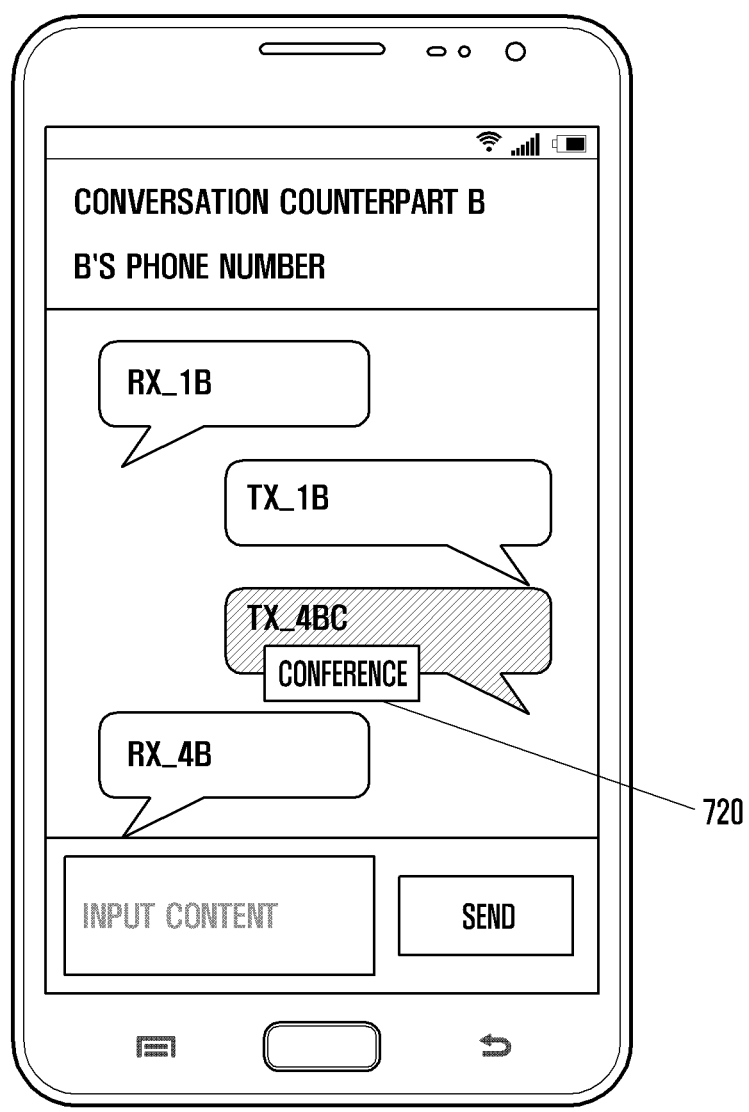

FIGS. 7A and 7B are diagrams illustrating example text message display screens in accordance with aspects of the present disclosure. Referring now to FIG. 7A, a conference call button 710 may be displayed in addition to the list screen of FIG. 5B. The screen of FIG. 7A may be displayed when the group text message TX_4BC is selected in the screen of FIG.A 5A. The conference call button 710 may be an interface that allows a user to start a conference call with recipients B and C. For example, when the user selects the conference call button 710, the controller 260 may start a conference call with recipients B and C. Before the conference call, an interface may be displayed that allows a user to confirm a start of the conference call. In one example, controller 260 may provide an interface that enables the user to generate a group by selecting some of the recipients B and C. If the number of the recipients is three or more, a conference call may be started by selecting two or more recipients.

Referring now to the example in FIG. 7B, a conference call button 720 is shown in the conversational view screen. The function of the conference call button 720 may be set to be identical or similar to that of the conference call button 710 of FIG. 7A.

A group text message button may be displayed in the same manner as conference call buttons 710 and 720 of FIGS. 7A and 7B. In this instance, the group text message button may be used to transmit a group text message to recipients B and C. The operation method may be a method identical to those of the conference call button 710 and 720.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

Each block of the flowchart illustrations may represent a module, segment, or portion of code, which includes one or more executable instructions for implementing the specified logical function(s). It should also be noted that in some alternative implementations, the functions noted in the blocks may occur out of the stated order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

The message displaying apparatus may include one or more portable electronic apparatus such as a cellular phone, a Personal Digital Assistant (PDA), a navigation, a digital broadcast recipient, or a Portable Multimedia Player (PMP).

It is understood that the techniques of the present disclosure may be implemented in another form within the spirit and scope of the present disclosure. Therefore, it should be understood that the above-described examples are illustrative and are not limiting under any possible interpretation. The scope of the present disclosure is defined by the appended claims to be described later, rather than the detailed description. Accordingly, it should be appreciated that all modifications or variations derived from the scope of the appended claims and their equivalents are included in the present disclosure.

Meanwhile, although examples herein have been shown and described in this specification and drawings, they are used in general sense in order to explain the technical content of the present disclosure to one of ordinary skill in the art, and are not intended to limit the scope of the present disclosure. It is understood that other modified examples on the basis of the spirit of the present disclosure can be implemented.

What is claimed is:

1. A method comprising:
obtaining transmitted and received text messages to and from a recipient;
displaying, in an individual conversational view, the transmitted and received text messages in a chronological order that include group text messages transmitted to a group of recipients and individual text messages transmitted and received to and from just the recipient, wherein the group text messages include two or more groups that are displayed to be differentiated from each respective group of the two or more groups and from the individual text messages, while the group text messages and the individual text messages are displayed together as part of a same conversation in the individual conversational view;
displaying a list of each recipient of a group text message sent to the group of recipients;
adding at least one or more of the recipients in the list to a contact group, in response to a first input detected via an interface; and
generating a new contact group including at least one or more of the recipients of the list, in response to a second input comprising a selecting of a group generating button, detected via the interface.

2. The method of claim 1, further comprising displaying a list of each recipient of a group text message sent to the group of recipients, when a selection of the group text message is detected.

3. The method of claim 2, further comprising displaying a predetermined number of most recent text messages received by each recipient in response to the group text message sent to the group of recipients, when a selection of the list is detected.

4. The method of claim 2, further comprising:
displaying messages transmitted to and from a given recipient in the chronological order, when selection of the given recipient is detected.

5. The method of claim 2, further comprising:
adding at least one or more of the recipients in the list to a contact group, in response to a first input detected via an interface; and
generating a new contact group including at least one or more of the recipients of the list, in response to a second input detected via the interface.

6. The method of claim 2, further comprising performing a conference call with at least one or more of the recipients on the list, in response to an input received through an interface.

7. The method of claim 2, further comprising transmitting a new group text message to one or more of the recipients on the list, in response to receiving an input selection of a group text message button through an interface.

8. The method of claim 1, further comprising:
transmitting a new group text message to the group of recipients; and
associating the new group text message with each recipient in the group of recipients.

9. A message displaying apparatus comprising:
a controller configured to:
obtain transmitted and received text messages that were to and from a recipient;
display, in an individual conversational view, via a display unit the transmitted and received text messages in a chronological order that include group text messages transmitted to a group of recipients and individual text messages transmitted and received to and from just the recipient;
display, via the display unit, a list of each recipient of a group text message sent to the group of recipients;
add at least one or more of the recipients in the list to a contact group, in response to a first input detected via an interface; and
generate a new contact group including at least one or more of the recipients of the list, in response to a second input comprising a selection of a group generating button, detected via the interface,
wherein the group text messages include two or more groups that are displayed to be differentiated from each respective group of the two or more groups and from the individual text messages, while the group text messages and the individual text messages are displayed together as part of a same conversation in the individual conversational view.

10. The message displaying apparatus of claim 9, wherein the controller is further configured to:
detect a selection on an input unit of a group text message sent to the group of recipients; and
display a list of the recipients in the group, in response to the selection.

11. The message displaying apparatus of claim 10, wherein the controller is further configured to control display, on the display unit, of a predetermined number of most recent responses to the group text message by a selected recipient in the list.

12. The message displaying apparatus of claim 10, wherein the controller is further configured to control display, on the display unit, transmitted and received text messages to and from a selected recipient in the list in a chronological order.

13. The message displaying apparatus of claim 10, wherein the controller is further configured to:
add at least one or more of the recipients in the list to a contact group, in response to a first input detected via the input unit; and
generate a new contact group including at least one or more of the recipients of the list, in response to a second input detected via the input unit.

14. The message displaying apparatus of claim 10, wherein the controller is further configured to perform a conference call with at least one of the recipients on the list, in response to an input received through the input unit.

15. The message displaying apparatus of claim 10, wherein the controller is further configured to transmit a new group text message to the group of recipients in response to an input comprising a group text message button detected on the input unit.

16. The message displaying apparatus of claim 9, wherein the controller is configured further to:
- transmit a new group text message to the group of recipients; and
- associate the new group text message with each recipient in the group of recipients.

* * * * *